Dec. 30, 1969  CHENG P. WEN  3,487,329

LASER COLOR CONTROL

Filed April 28, 1966

INVENTOR.
CHENG P. WEN
BY
Edward J. Norton
ATTORNEY

United States Patent Office 3,487,329
Patented Dec. 30, 1969

3,487,329
LASER COLOR CONTROL
Cheng P. Wen, Trenton, N.J., assignor to RCA
Corporation, a corporation of Delaware
Filed Apr. 28, 1966, Ser. No. 546,006
Int. Cl. H01s 3/02
U.S. Cl. 331—94.5                                6 Claims

ABSTRACT OF THE DISCLOSURE

A color switch for a laser which has a tendency for simultaneously radiating both of two colors which are relatively widely spaced in wavelengths. The color switch, which selectively permits the laser to radiate either but not both of the two colors, includes polarization responsive means, such as a Brewster angle window, located within the wide band optical resonant cavity of the laser and wavelength responsive polarization control means, such as an electro-optic crystal, located within the cavity. The polarization responsive means permits radiation having substantially only a given polarization to be propagated through the cavity and the wavelength responsive polarization control means selectively provides either but not both of the first and second colors with a polarization substantially equal to the given polarization.

---

This invention relates to lasers and more particularly to a novel method and apparatus for controlling the color of energy generated by a laser.

Many of today's lasers are capable of simultaneously generating energy at a plurality of colors. This is especially true of the gas ion lasers. The potential applications for these lasers require color selection and control.

It is an object of the present invention to provide a method and apparatus for laser color switching.

It is a further object of the present invention to provide a laser "color switch" which enables the color of the laser to be selected by an electric control signal.

A further object of the present invention is to provide a color switch for a multi-color gas laser.

The present invention employs a cavity which is capable of simultaneously sustaining oscillations at a plurality of different colors. Placed within the cavity are an active laser mateiral which can simultaneously generate energy at a plurality of colors, a polarizing element to polarize the energy generated by the active material, and a control element which changes the polarization of the energy. The polarization change caused by the control element is a function of the frequency or color of the energy. Thus, the polarization change of red light for example differs from that of blue light. Means are provided to vary the polarization change caused by the control element.

The polarizing element rejects energy from the cavity in an amount dependent upon the polarization change introduced by the control element. The laser is desirably adjusted so that laser oscillations occur only at the color of light rejected in the least amount by the polarizing element. The system may, however, be designed so that laser oscillations occur at a number of colors simultaneously. The number of colors oscillating in the cavity at any one time, depends not only on the polarization change, but also on the characteristics of the cavity and on the amplification capabilities of the active material.

The color generated by the laser is changed by varying the polarization change introduced by the control element. In a preferred embodiment, the control element is an electro-optic crystal in which an electric field is established. The polarization change is varied by varying the electric field.

A more detailed description of the invention will be given with reference to the accompanying drawing in which.

Figure 1:
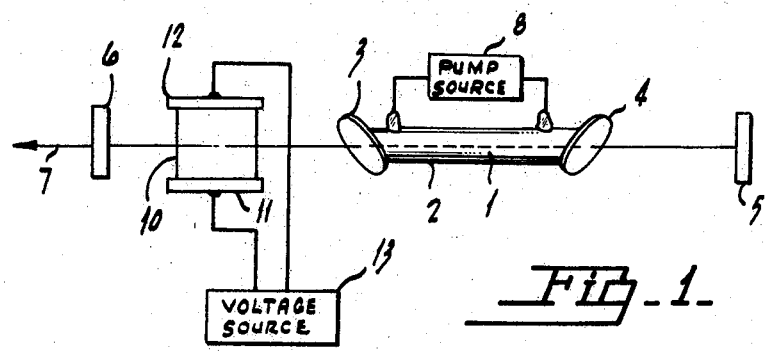
FIG. 1 is a diagram of one embodiment of the present invention.
Figure 3:
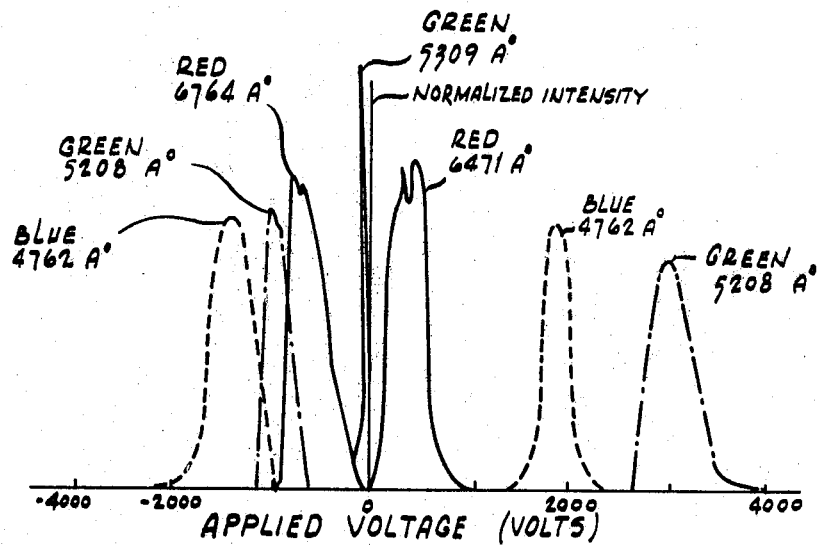
FIG. 3 is a graph used to describe the operation of the FIGURE 1 embodiment.

FIG. 1 is a diagram of a laser where an active laser material 1, which is capable of simultaneously generating energy at a plurality of colors, is contained within a suitable container 2, for example a quartz or glass tube. In the embodiment shown, the active material is an ionized gas, such as krypton. Other gases or gas mixtures may be used. The tube 2 is terminated in two Brewster angle windows 3 and 4 which act as polarizing elements. Other polarizing elements may be used in place of the windows 3 and 4. The construction of the tube 2 with the windows 3 and 4 is conventional in the laser art. The tube 2 is positioned within a cavity formed by two broad band mirrors 5 and 6 in themselves of conventional construction which are capable of simultaneously sustaining laser oscillations at a plurality of colors. A pulse discharge pump 8 supplies exciting energy to the active material 1 in a conventional manner. Other pumps, for example D.C. or R.F. discharges, may be used. The mirror 6 is partially transmissive to allow a portion of the energy within the cavity to exit as a beam 7.

A control element, 10, preferably an electro-optic crystal, is also positioned within the cavity. The control element 10 is substantially transparent to all colors which are to be generated by the laser. A suitable material for the crystal 10 is a KDP (potassium dyhydrogen phosphate) crystal having dimensions of about $\frac{1}{2}''$ x $\frac{1}{4}''$ x $\frac{1}{8}''$, where the longest dimension is along the cavity axis. Electrodes 11 and 12 are attached to the crystal 10 in a conventional manner and an electric field is established perpendicular to the cavity axis by applying a voltage to the electrodes 11 and 12 from a voltage source 13. While an electro-optic crystal has been shown, it should be noted that any device which changes the polarization of light passing through it as a function of the frequency (color) of the light and which provides some mechanism for varying the change in polarization may be employed. For example, magneto-optic or piezoelectric crystals may be used. Also, in this embodiment, the transverse electro-optic effect is employed. The longitudinal effect may also be used.

The optic axis of KDP crystal 10 is perpendicular to the electrodes 11 and 12 and at 45 degrees with respect to the polarization of the light preferred by the cavity. The $x$ and $y$ axes of the crystal are at 45° to the cavity axes.

Figure 2:
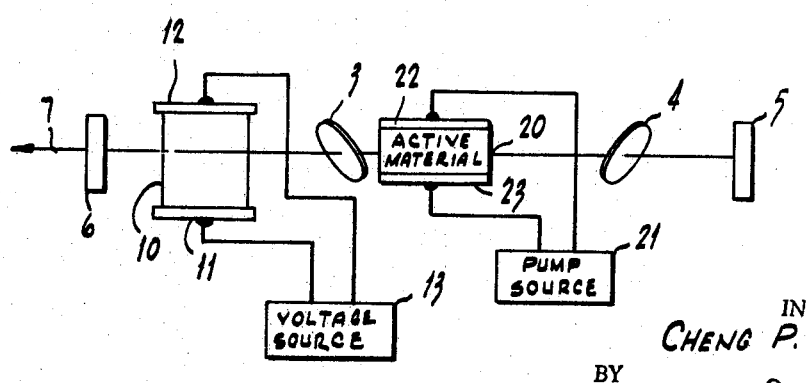
FIG. 2 is a diagram of a second embodiment of the present invention.

The embodiment shown in FIG. 2 is essentially the same as that of FIG. 1 except that here a semiconductor active material 20, such as gallium arsenide is employed. The other elements of the FIG. 2 embodiment are the same as in FIG. 1 and are similarly numbered. The semiconductor 20 is pumped by current supplied from a current source 21 to the semiconductor 20 by two electrodes 22 and 23. The operation of gallium arsenide at two different "colors" is described by Nelson et al., App. Phys. Lett. vol. 4, No. 11, p. 192, June 1964. The left and right ends of the material 20 are preferably coated with anti-reflecting material. Two Brewster angle windows 3 and 4 again serve as polarizing elements. The operation of the FIG. 2 embodiment is essentially the same as that of FIG. 1. In the description that follows, therefore, reference will be made only to the FIG. 1 embodiment; it should be understood that the description applies equally to FIG. 2.

Also, while only a gas and a semiconductor have been specifically shown, it should be noted that any multicolor active material may be used.

The laser is preferably adjusted to provide approximately the same single pass gain for each of the colors generated. This can be accomplished by controlling the reflectivity of the mirrors 5 and 6, by controlling the pressure of the gas 1, or by merely choosing an active material which has this characteristic. Krypton, for example, is such a material. The color generated by the laser may then be easily controlled by the electric field applied to the crystal 10.

The crystal 10 is birefringent, whether or not an electric field is applied from the source 13, to any light passing through it along the cavity axis. The birefringence causes the light to propagate in the crystal 10 as two components one having a polarization parallel to the optic axis and the other having a polarization perpendicular to the optic axis. The two components undergo a relative phase retardation which, in effect, changes the linearly polarized light emerging from the window 3 to elliptically polarized light. The amount of phase retardation, and therefore polarization change, introduced by the crystal 10 is dependent upon both the color of the light passing through the crystal 10 and the magnitude of the electric field established in the crystal 10. Thus, for a particular value of electric field, red light generated by the active material 1, will suffer a different phase retardation and polarization change than will green light or blue light.

The laser gain is preferably adjusted so that the only color light which will oscillate in the cavity is light whose polarization changes by approximately 180 degrees, or a multiple thereof, as it travels from the window 3, through the crystal 10, to the mirror 6, and back to the window 3 through the crystal 10. Light undergoing any other polarization change is rejected from the cavity by the windows 3 and 4 to a degree which prohibits lasing. In general, the condition of a 180 degree polarization change occurs for only one color at any one value of electric field. Therefore, only that particular color will oscillate in the cavity for that particular value of electric field. As the phase retardation introduced by the crystal 10 is varied by varying the voltage across the crystal 10, the particular color for which the condition of 180 degrees polarization change exists will vary. Thus, the color oscillating in the cavity and generated as the output beam 7 will depend upon the voltage applied across the crystal 10.

FIGURE 2 shows the result of an experiment using an embodiment of the invention as shown in FIG. 1. The normalized intensities of various lines of the krypton laser medium 1 are plotted in FIG. 2 as a function of voltage applied to the crystal 10. At zero volts or at a very slightly negative voltage the green line at 5309 A. (angstroms) oscillates. (The terms "negative" and "positive" are used merely to distinguish the two field directions used in the experiment. They have no specific relation to the description of the FIG. 1 embodiment given above.) As the negative voltage is increased to about 800 volts the red line at 6764 A. oscillates. A slightly greater voltage produces the green line 5208 A. and a slightly greater voltage gives the blue line at 4762 A. For voltages applied in the positive direction the spacing between the colors is greater. It should be noted however that in the negative direction a total voltage change of less than 1500 volts can be used to produce all three colors, red, green, and blue. This characteristic makes the device very suitable for color display purposes provided it is coupled with suitable means (not shown) for deflecting the light beam.

What is claimed is:

1. In a laser comprising a wide band optical resonant cavity capable of simultaneously resonating at a first relatively long wavelength manifesting a first color and at a second relatively short wavelength manifesting a second color which is spaced from said first wavelength by at least a substantial fraction of said second wavelength, and an active lasing medium located within said cavity, said active lasing medium being capable of simultaneously emitting photons at both said first and second wavelengths whereby there is a tendency for said laser to simultaneously radiate both said first and second colors; the improvement therewith of a color switch for selectively permitting said laser to radiate either but not both of said first and second colors, said color switch including polarization responsive means located within said cavity for permitting radiation having substantially only a given polarization to be propagated through said cavity, and wavelength responsive polarization control means for selectively providing either but not both of said first and second wavelengths with a polarization substantially equal to said given polarization.

2. The laser defined in claim 1, wherein said polarization responsive means incudes at least one Brewster angle window within said cavity.

3. The laser defined in claim 2, wherein said active medium is a gas enclosed within a tube, and wherein said Brewster angle window is located at one end of said tube.

4. The laser defined in claim 3, wherein said gas is krypton.

5. The laser defined in claim 1, wherein said wavelength responsive polarization control means is solely an electro-optic crystal located within said cavity in cooperative relationship with said polarization responsive means, said crystal having a first potential difference of first given magnitude and polarity applied thereto when said first wavelength is selected and having a second potential difference of second given magnitude and polarity different from said first given magnitude and polarity when said second wavelength is selected.

6. The laser defined in claim 1, wherein said active medium is solid, and said polarization responsive means is at least one Brewster angle window.

References Cited

UNITED STATES PATENTS

| 3,302,028 | 1/1967 | Sterzer | 331—94.5 X |
| 3,392,353 | 7/1968 | Miller | 331—94.5 X |
| 3,395,364 | 7/1968 | Bridges | 331—94.5 |

OTHER REFERENCES

Targ, R., and Massey, G. A.: Proceedings of the IEEE, vol. 52, No. 10, October 1964, pp. 1247–1248.

Myers, R. A., and Pole, R. V.: Laser Having Variable Frequencies, IBM Technical Disclosure Bulletin, vol. 8, No. 9, February 1966, p. 1252.

JEWELL H. PEDERSEN, Primary Examiner

T. MAJOR, Assistant Examiner